(12) United States Patent
Tohyama et al.

(10) Patent No.: US 11,585,377 B2
(45) Date of Patent: Feb. 21, 2023

(54) BALL BEARING

(71) Applicants: KABUSHIKI KAISHA TOYOTA CHUO KENKYUSHO, Nagakute (JP); JTEKT CORPORATION, Kariya (JP)

(72) Inventors: Mamoru Tohyama, Nagakute (JP); Yasuhiro Ohmiya, Nagakute (JP); Norikazu Sato, Nagakute (JP); Michiru Hirose, Yao (JP); Takaaki Onizuka, Kashiwara (JP); Yoshio Tateishi, Yamatotakada (JP); Kenichi Hasegawa, Osaka (JP); Takuya Toda, Kashiwara (JP); Komatsugu Nishimura, Toyota (JP); Yuya Yamamoto, Osaka (JP)

(73) Assignees: KABUSHIKI KAISHA TOYOTA CHUO KENKYUSHO, Nagakute (JP); JTEKT CORPORATION, Kariya (JP)

( * ) Notice: Subject to any disclaimer, the term of this patent is extended or adjusted under 35 U.S.C. 154(b) by 0 days.

(21) Appl. No.: 17/684,209

(22) Filed: Mar. 1, 2022

(65) Prior Publication Data

US 2022/0333645 A1 Oct. 20, 2022

(30) Foreign Application Priority Data

Apr. 16, 2021 (JP) ............................. JP2021-069923

(51) Int. Cl.
*F16C 33/41* (2006.01)
*F16C 33/66* (2006.01)
*F16C 19/06* (2006.01)
*F16C 33/44* (2006.01)

(52) U.S. Cl.
CPC ............ *F16C 33/416* (2013.01); *F16C 19/06* (2013.01); *F16C 33/44* (2013.01); *F16C 33/6651* (2013.01); *F16C 2380/26* (2013.01)

(58) Field of Classification Search
CPC ...... F16C 19/06; F16C 33/412; F16C 33/414; F16C 33/416; F16C 33/44; F16C 33/6651; F16C 33/6659; F16C 2380/26
See application file for complete search history.

(56) References Cited

U.S. PATENT DOCUMENTS 2,491,728 A * 12/1949 Grafton ................... F16C 33/60
384/475
10,605,307 B1 * 3/2020 Hoffmann ........... F16C 33/3887

FOREIGN PATENT DOCUMENTS

| DE | 102008059571 A1 * | 6/2010 | ............ F16C 33/416 |
| DE | 102013209642 A1 * | 11/2014 | ............ F16C 33/416 |
| DE | 102019116467 A1 * | 12/2020 | |
| JP | 2005083554 A * | 3/2005 | ............ F16C 33/416 |
| JP | 2007292117 A * | 11/2007 | .......... F16C 33/3806 |
| JP | 2008-144777 A | 6/2008 | |
| JP | 2010025199 A * | 2/2010 | ............ F16C 33/416 |

* cited by examiner

*Primary Examiner* — Phillip A Johnson
(74) *Attorney, Agent, or Firm* — Oliff PLC

(57) ABSTRACT

A holder has a protrusion which protrudes from a side surface at a side opposite in an axial direction with respect to a rolling element held in a pocket toward the side opposite in the axial direction. An oil supply hole which penetrates through the holder from the side surface to a surface at a side of the rolling element in the axial direction is formed in the holder. When the holder rotates, the protrusion guides oil into the oil supply hole, and the oil is introduced from the side surface of the holder to the surface on the side of the rolling element.

5 Claims, 15 Drawing Sheets

BALL BEARING

CROSS REFERENCE TO RELATED APPLICATION

This application claims priority to Japanese Patent Application No. 2021-069923 filed on Apr. 16, 2021, which is incorporated herein by reference in its entirety including the specification, claims, drawings, and abstract.

TECHNICAL FIELD

The present disclosure relates to a ball bearing.

BACKGROUND

JP 2008-144777 A discloses a ball bearing in which a holder which holds a rolling element of a ball bearing in a manner to allow rolling is formed from a resin composition, and dimples are formed in a dispersed manner on the sliding-contact surface of the holder on which the rolling element slidingly contacts the holder, to thereby provide an oil-retaining characteristic.

JP 2008-144777 A discloses a measure to improve the oil-retaining characteristic by forming the dimples on the sliding-contact surface of the holder on which the rolling element slidingly contacts the holder in such a manner as to create an oil reservoir, to thereby suppress shortages of oil during high-speed rotation. However, when this bearing is rotated at a high speed, inflow of oil to a rolling surface onto which the rolling element, which is rolling on raceway surfaces of an outer ring and an inner ring, is in contact is drastically reduced. Under such circumstances measures to improve the oil-retaining characteristic of the sliding-contact surface of the holder described in JP 2008-144777 A may prove insufficient to ensure sufficient oiling of the rolling surface.

In light of the above, a testing apparatus was fabricated which enables visualization of a lubrication state inside a ball bearing which rotates with a high speed, and the lubrication state inside the ball bearing was observed when a ball bearing of the related art was rotated at a high speed. The ball bearing 1 used for the evaluation testing was a visualized bearing having a shape corresponding to a model 6808, and of which only the outer ring 2 was made of quartz. FIGS. 7 and 8 show an overall structure of the ball bearing 1. As shown in FIGS. 7 and 8, the ball bearing 1 comprises the outer ring 2 which is made of quartz and transparent, an inner ring 3 made of a steel material, steel balls 4 which are rolling elements, and a holder 5 which holds the steel balls 4 spaced apart in the circumferential direction, in a manner to allow rolling.

FIGS. 9, 10, and 11 show the shape of the holder 5. In order to clearly show the shape of the holder 5, in FIG. 10 a cross section of only the holder 5 and the steel ball 4 are shown. On the holder 5, a pocket 6 which holds the steel ball 4 in a manner to allow rolling is formed on one side in an axial direction, with the pocket 6 having a shape with one side opened. A side surface 7 on the other side in the axial direction of the holder 5 is flat. On the side surface 7 of the holder, no oil-passing hole penetrating in the axial direction is formed.

FIG. 12 shows an overview of the testing apparatus used for the evaluation testing. A rotational shaft 8 extending in a horizontal direction is rotatably supported by two shaft supporting bearings 9, and is rotated by a motor 10. The rotational shaft 8 is inserted into and fixed on an inner side of the inner ring 3 of the ball bearing 1, and the inner ring 3 rotates integrally with the rotational shaft 8. The outer ring 2 of the ball bearing 1 is fixed at the inside of a housing 11. A camera 12 is placed above the ball bearing 1. Because an observation hole 13 is formed in the housing 11 above the ball bearing 1, the camera 12 can image a topmost part of the outer ring 2 from above.

An oil supply nozzle 14 supplies oil between the topmost part of the outer ring 2 and the inner ring 3, and the oil accumulated in the housing 11 below the ball bearing 1 is recovered and circulated by an oil pump 15. The oil used was a commercially available automatic transmission fluid (ATF), Toyota Auto Fluid WS, into which a fluorescent agent Coumarin-6 was mixed, and the distribution of an amount of oil was observed using a fluorescence method. An LED flash illumination with a wavelength of 405 nm was used as an excitation light.

FIG. 13 is a top view of the ball bearing 1. Because the outer ring 2 is made of transparent quartz, a raceway surface 3a of the inner ring 3 and a position of the steel ball 4 can also be evaluated when the ball bearing 1 is viewed from above. The region in FIG. 13 surrounded by a broken line is the observation region of the camera 12. The observation region 12 has a field of view of 23.6 mm×17.7 mm. When the LED flash was set to illuminate every 3 μsec, light was illuminated corresponding to a frame rate of 40 fps of the camera 12, and oil distribution inside the rotating ball bearing 1 was observed. With the oil supply to the ball bearing 1 maintained at a constant of 100 ml/min, and the radial load applied to the ball bearing 1 from above held at a constant 300 N, a rotational rate around the axis was varied between about 2000 rpm and about 20000 rpm for observation.

FIGS. 14 and 15 schematically show the resulting observed oil distribution around the rolling surface. FIG. 14 shows the result observed at an axial rotational rate of about 2000 rpm (specifically, 1910 rpm), and FIG. 15 shows the result observed at an axial rotational rate of about 20000 rpm (specifically, 20200 rpm). In FIGS. 14 and 15, the position of the steel ball 4 is shown with a solid line, a center line of the steel ball 4 is shown with a one-dot-and-chain line, and a position of the holder 5 is shown with a two-dots-and-chain line. The steel ball 4 revolves toward a right side of FIGS. 14 and 15. FIGS. 14 and 15 also show the oil supply nozzle 14. In FIGS. 14 and 15, regions where a greater amount of oil was observed are shown with thicker slanted lines, while white regions show where oil was almost non-existent.

As shown in FIG. 14, when the axial rotational rate is relatively low, about 2,000 rpm, the oil fills the entirety of all regions other than the region near an exit side of the steel ball 4 (left side of the steel ball 4 in FIG. 14). On the exit side of the steel ball 4, a region of a low amount of oil can be observed, which can be deduced as resulting from removal of the oil due to revolution of the steel ball 4 or occurrence of cavitation.

As shown in FIG. 15, when the axial rotational rate is relatively high, about 20,000 rpm, the oil does not fill the revolution raceway portion of the steel ball 4 and the holder 5, but is distributed at an outer side in the axial direction or near a boundary of the revolution raceway portion. This can be deduced to be caused by excessive increase of the rate of removal of oil with respect to the rate of inflow rate of oil due to the revolution of the steel ball 4 and the rotation of the holder 5 at high speed, and to enlargement of the cavitation region at the exit side of the steel ball 4 (at the left side of the steel ball 4 in FIG. 15) as a consequence of the higher rate of revolution of the steel ball 4. A large triangular shaped pool of oil is present at the entrance side of the steel ball 4 (the right side of the steel ball 4 in FIG. 15). This can be deduced to be caused by supply of the oil from the side of the inner ring 3 at an opening of the U-shape pocket 6 of the holder 5. However, in either case, as under the high speed conditions the amount of oil at the entrance side of the steel ball 4 and at a vertex portion of the steel ball 4 which becomes the rolling surface with the outer ring 2 is reduced as compared to under low speed rotation, it can be seen that an oil deficiency has occurred. From the viewpoint of reduction of a frictional torque, a lower amount of oil on the rolling surface is superior, but from the viewpoint of prevention of wear and seizing, excessive oil deficiency must be suppressed.

As described, observation of the distribution of the oil inside of the ball bearing 1 revealed that, during high speed rotation, the oil was wiped off by the steel ball 4 and the holder 5 rotating at a high speed, and the amount of oil flowing into the raceway portions of the steel ball 4 and the holder 5 was very low. Although it may be possible under such conditions to suppress seizing and wear by improving the oil-retaining characteristic through the measure described in JP 2008-144777 A for short-term usage, the oil will eventually dry up after a long period of time under such usage conditions, resulting in an inability to suppress seizing and wear. Thus, in order to suppress seizing and wear over a long-term usage of the ball bearing at a high speed rotation, it is necessary to promote oil inflow to the entrance side of the steel ball 4, for which the provision of the dimples as disclosed in JP 2008-144777 A is insufficient.

An advantage of the present disclosure lies in provision of a ball bearing in which, even with a high-speed rotation, the oil deficiency at the rolling surface can be suppressed, and occurrence of seizing or wear can be suppressed.

SUMMARY

According to one aspect of the present disclosure, there is provided a ball bearing comprising an outer ring on a surface at an inner side in a radial direction of which an outer raceway is formed; an inner ring on a surface at an outer side in a radial direction of which an inner raceway is formed; a plurality of rolling elements placed between the outer raceway and the inner raceway; and a holder having a circular ring shape and on which a plurality of pockets which hold the rolling elements with a spacing in the circumferential direction and in a manner to allow rolling are formed, wherein the holder comprises a protrusion which protrudes from a side surface at a side opposite in an axial direction with respect to the rolling element held in the pocket toward the side opposite in in the axial direction, and an oil supply hole which penetrates through the holder from the side surface to a surface at a side of the rolling element in the axial direction is formed in the holder, in such a manner that, when the holder is rotated, the protrusion guides oil into the oil supply hole and the oil pours from the side surface to the surface.

According to the present disclosure, because the oil is introduced during rotation of the holder from outside of a revolution region of the rolling element to an entrance side of the rolling element, a ball bearing can be provided in which sufficient oil on the rolling surface can be ensured and seizing and wear can be suppressed, even when the ball bearing rotates at a high speed.

According to another aspect of the present disclosure, the oil supply hole may be placed between pockets which are adjacent to each other in the circumferential direction, and, with a direction of rotation and advancement of the holder being a front side in the circumferential direction and an opposite direction being a rear side in the circumferential direction, the protrusion may protrude from an end at the rear side in the circumferential direction of an oil introduction inlet of the oil supply hole toward the front side in the circumferential direction, and an oil guide surface which is inclined toward the front side in the circumferential direction as a distance from the side surface at the side opposite in the axial direction is increased may be provided at the front side in the circumferential direction of the protrusion.

According to this configuration, because the oil is introduced from the oil introduction inlet adjacent to the oil guide surface of the projection to the oil supply hole with the rotation of the holder, a ball bearing can be provided in which sufficient oil on the rolling surface can be ensured and seizing and wear can be suppressed, even when the ball bearing rotates at a high speed.

According to another aspect of the present disclosure, a height in the axial direction of the protrusion may between 1 mm and 10 mm, an angle between the side surface and the oil guide surface may be between 10 and 80 degrees, a width in the circumferential direction of the protrusion may be greater than or equal to 1 mm, and, when the number of the rolling elements is n, a width angle in the circumferential direction of the protrusion may be less than or equal to $2\pi/2n$, and a thickness in the radial direction of the protrusion may be at least half and no more than the maximum thickness in the radial direction of the holder.

According to this configuration, a ball bearing can be provided in which wiping-off of the oil by the protrusion and an increase in a resistance of the protrusion are suppressed even when the ball bearing rotates at a high speed, such sufficient oil on the rolling surface can be ensured and seizing and wear can be suppressed, even when the ball bearing rotates at a high speed.

According to another aspect of the present disclosure, with a direction of rotation and advancement of the holder being a front side in the circumferential direction and an opposite direction being a rear side in the circumferential direction, an oil introduction inlet of the oil supply hole may be provided on a surface at the front side in the circumferential direction of the projection such that the oil introduction inlet has an opening facing the front side in the circumferential direction, and an oil discharge outlet of the oil supply hole may be provided at a position where the oil is discharged to a semispherical portion at the front side in the circumferential direction of the rolling element.

According to this configuration, because when the holder rotates the oil is introduced from the oil introduction inlet which has an opening facing the front side in the circumferential direction, the oil is introduced to the semispherical portion at the front side in the circumferential direction of the rolling element, and a ball bearing can be provided in which sufficient oil on the rolling surface can be ensured and seizing and wear can be suppressed, even when the ball bearing rotates at a high speed.

According to another aspect of the present disclosure, the oil supply hole may be formed in such a manner that an area of a passageway is reduced from the oil introduction inlet toward the oil discharge outlet.

According to this configuration, because the oil supply hole is formed in such a manner that the area of the passageway is reduced from the oil introduction inlet toward the oil discharge outlet, an oil flow rate at the oil discharge outlet can be increased, and spreading of oil due to centrifugal force during high-speed rotation can also be reduced.

According to the present disclosure, a ball bearing can be provided in which sufficient oil on the rolling surface can be ensured and seizing and wear can be suppressed, even when the ball bearing rotates at a high speed.

BRIEF DESCRIPTION OF DRAWINGS

Embodiments of the present disclosure will be described based on the following figures, wherein.

DESCRIPTION OF EMBODIMENTS

First Embodiment

Figure 1:
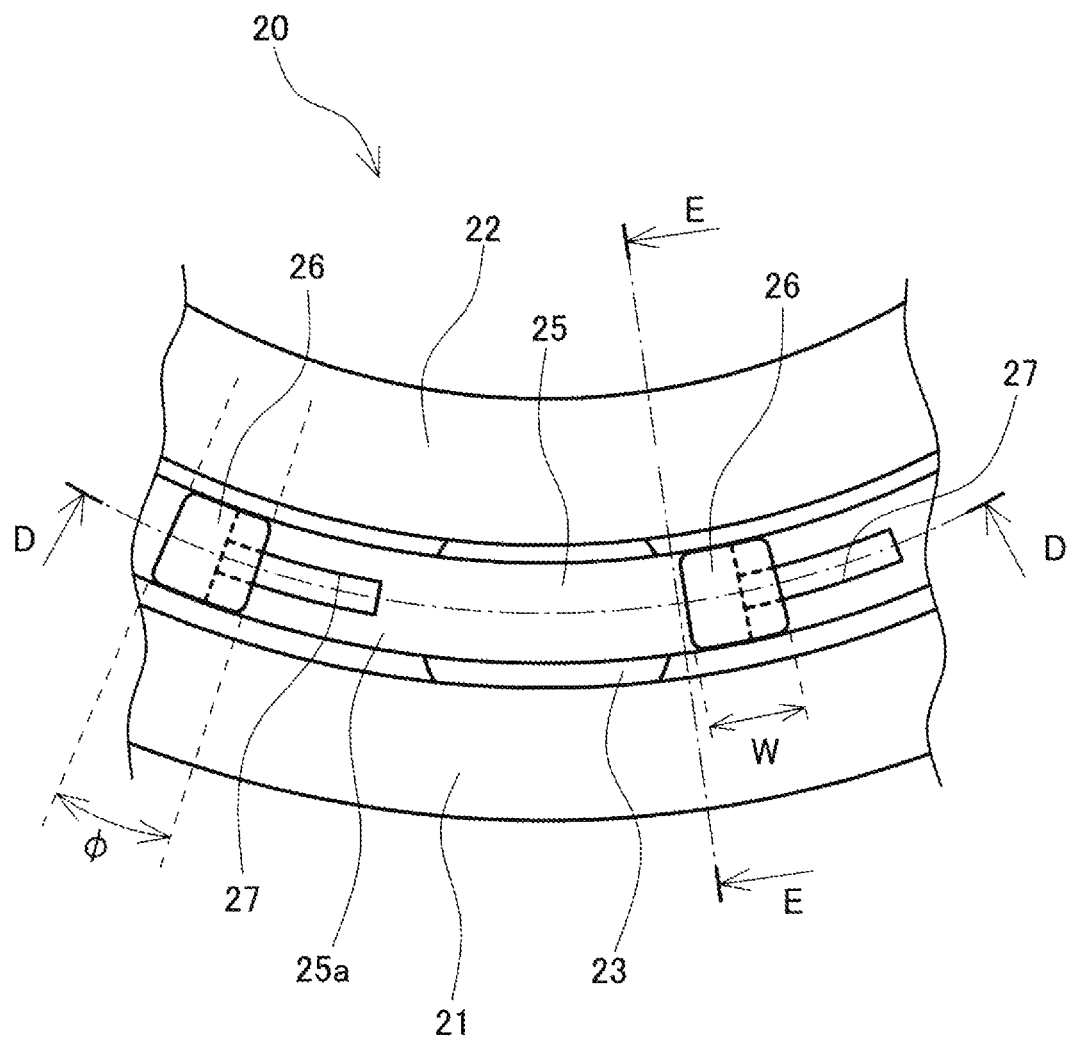
FIG. 1 is a diagram enlarging a part of a side surface of a ball bearing according to a first embodiment of the present disclosure.
Figure 2:
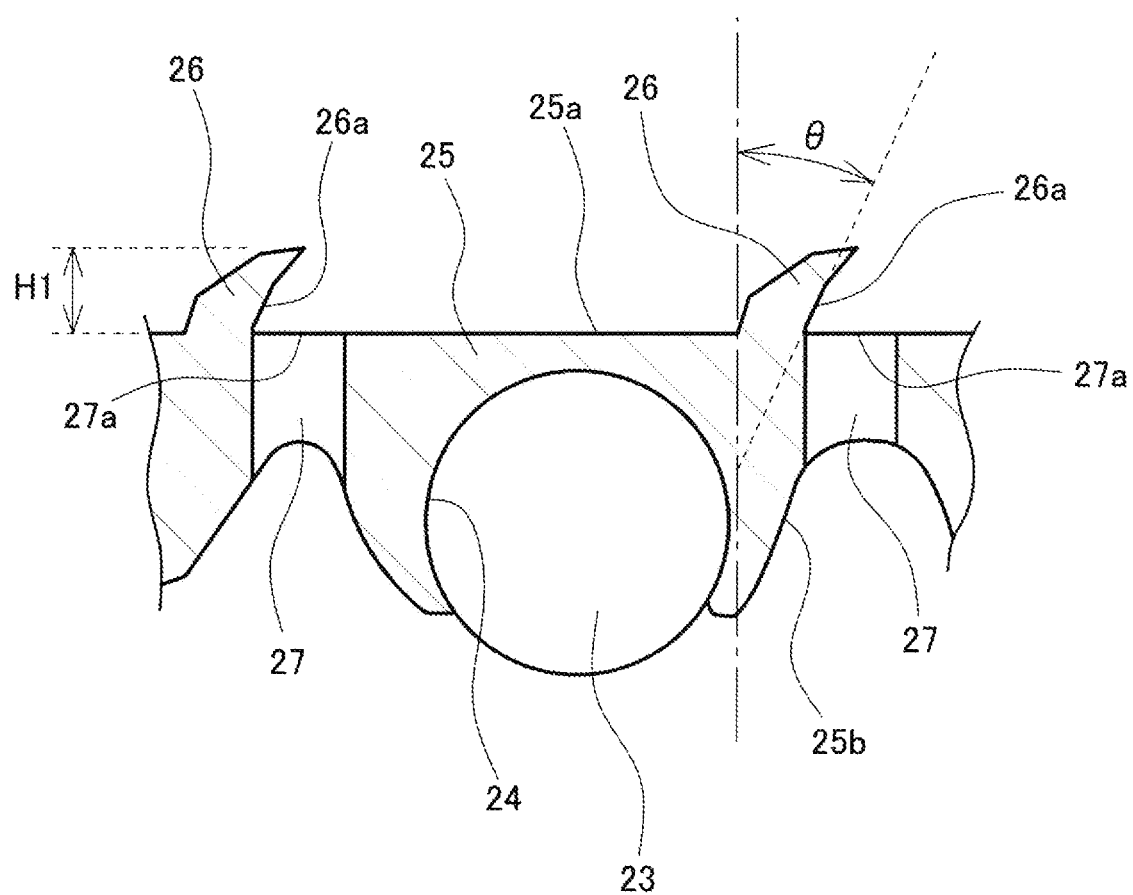
FIG. 2 is a diagram showing a cross section of a holder along a line D-D in FIG. 1.
Figure 3:
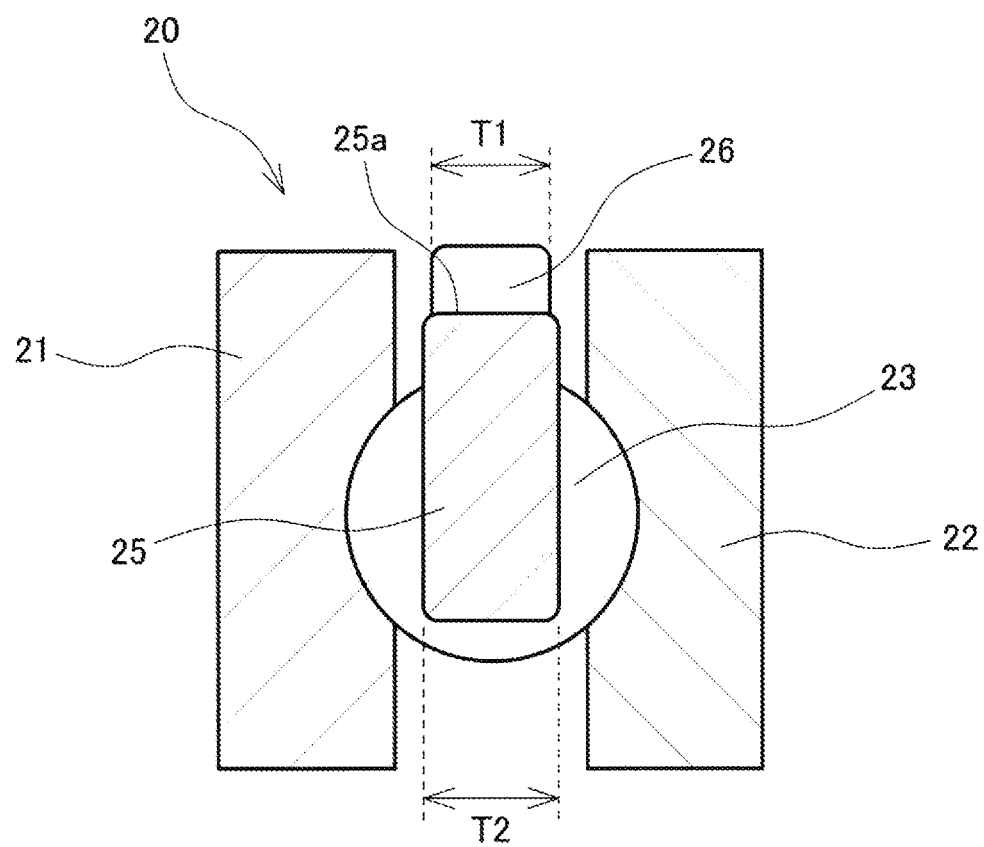
FIG. 3 is a cross sectional diagram along a line E-E in FIG. 1.

A ball bearing 20 according to a first embodiment of the present disclosure will now be described with reference to FIGS. 1 to 3. FIG. 1 is a partial view of the ball bearing 20 which has a circular ring shape. FIG. 2 is a cross-sectional diagram along a line D-D in FIG. 1, and shows a cross section of a holder 25 and a rolling element 23, for clearly showing the shape of the holder 25 provided in the ball bearing 20. FIG. 3 is a diagram showing a cross section along line E-E in FIG. 1. As shown in FIGS. 1, 2, and 3, the ball bearing 20 comprises an outer ring 21 on a surface at an inner side in a radial direction of which an outer raceway is formed, an inner ring 22 on a surface at an outer side in a radial direction of which an inner raceway is formed, a plurality of rolling elements 23 placed between the outer raceway and the inner raceway, and the holder 25 having a circular ring shape and on which pockets 24 for holding the rolling elements 23 with a spacing in a circumferential direction and in a manner to allow rolling are formed. When the inner ring 22 is rotated while the outer ring 21 is fixed, the rolling element 23 revolves in the same direction as a direction of rotation of the inner ring 22, and, with the revolution of the rolling element 23, the holder 25 rotates.

The ball bearing 20 is employed in usages in which a single primary rotational direction is predetermined such as, for example, a driving unit for an automobile, a machine tool, or the like. When the inner ring 22 is rotated in the ball bearing 20 in the primary rotational direction, the rolling element 23 revolves toward the right side of FIG. 2. In the following, the direction in which the holder 25 rotates and advances due to this rotation will be referred to as the front side in the circumferential direction (right side of FIG. 2) and the opposite direction will be referred to as the rear side in the circumferential direction (left side of FIG. 2).

On the holder 25, an oil supply hole 27 is formed which penetrates through the holder 25 from a side surface 25a at an opposite side in an axial direction (outer side) with respect to the rolling element 23 held on the pocket 24 to a surface 25b on a side of the rolling element 23 (inner side). The oil supply hole 27 is provided between pockets 24 which are adjacent to each other in the circumferential direction.

The holder 25 also comprises a protrusion 26 which protrudes from the side surface 25a toward an outer side in the axial direction. The protrusion 26 protrudes from an end at the rear side in the circumferential direction of an oil introduction inlet 27a at an outer side in the axial direction of the oil supply hole 27 toward the front side in the circumferential direction. At the front side in the circumferential direction of the protrusion 26, an oil guide surface 26a is provided which inclines further toward the front side in the circumferential direction as the distance from the side surface 25a in the axial direction increases. An angle θ between the side surface 25a and the oil guide surface 26a may be, for example, between 10 and 80 degrees.

In this manner, because the protrusion 26 is provided on the side surface 25a of the holder 25, and the oil supply hole 27 penetrating through the holder 25 in the axial direction is formed in the ball bearing 20, the protrusion 26 guides the oil into the oil supply hole 27 when the holder 25 rotates. Therefore, the oil can be introduced from the side surface 25a of the holder 25 to the surface 25b through the oil supply hole 27, at the front side in the circumferential direction of the rolling element 23. In other words, in the ball bearing 20, with the rotation of the holder 25, oil can be effectively introduced from the side surface 25a to the front side in the circumferential direction of the rolling element 23. As a result, sufficiency of oil at the rolling surface under a high rotation condition can be ensured, and seizing and wear can be suppressed.

A height H1 of the protrusion 26 in the axial direction may be, for example, between 1 mm and 10 mm. In order to guide the oil into the oil supply hole 27 by the protrusion 26, the height H1 may be set to 1 mm or more. On the other hand, when the height H1 is too high, wiping off of the oil is promoted, and resistance for rotating the holder 25 is increased. Thus, the height H1 may be set to 10 mm or less. For a similar reason, a thickness T1 of the protrusion 26 in the radial direction may be, for example, greater than or equal to half, but no greater than, a maximum thickness T2 of the holder 25 in the radial direction. Further, a width W of the protrusion 26 in the circumferential direction may be set to, for example, 1 mm or more. When the number of the rolling elements 23 is n, a width angle φ of the protrusion 26 in the circumferential direction may be set to, for example, less than or equal to 2π/2n.

By restricting the sizes of the protrusion 26 in this manner, the ball bearing 20 of the present embodiment can ensure sufficiency of oil at the rolling surface and suppress seizing and wear even when the ball bearing 20 rotates with a high speed, while suppressing the removal of oil by or increased resistance from the protrusion 26.

Second Embodiment

Figure 4:
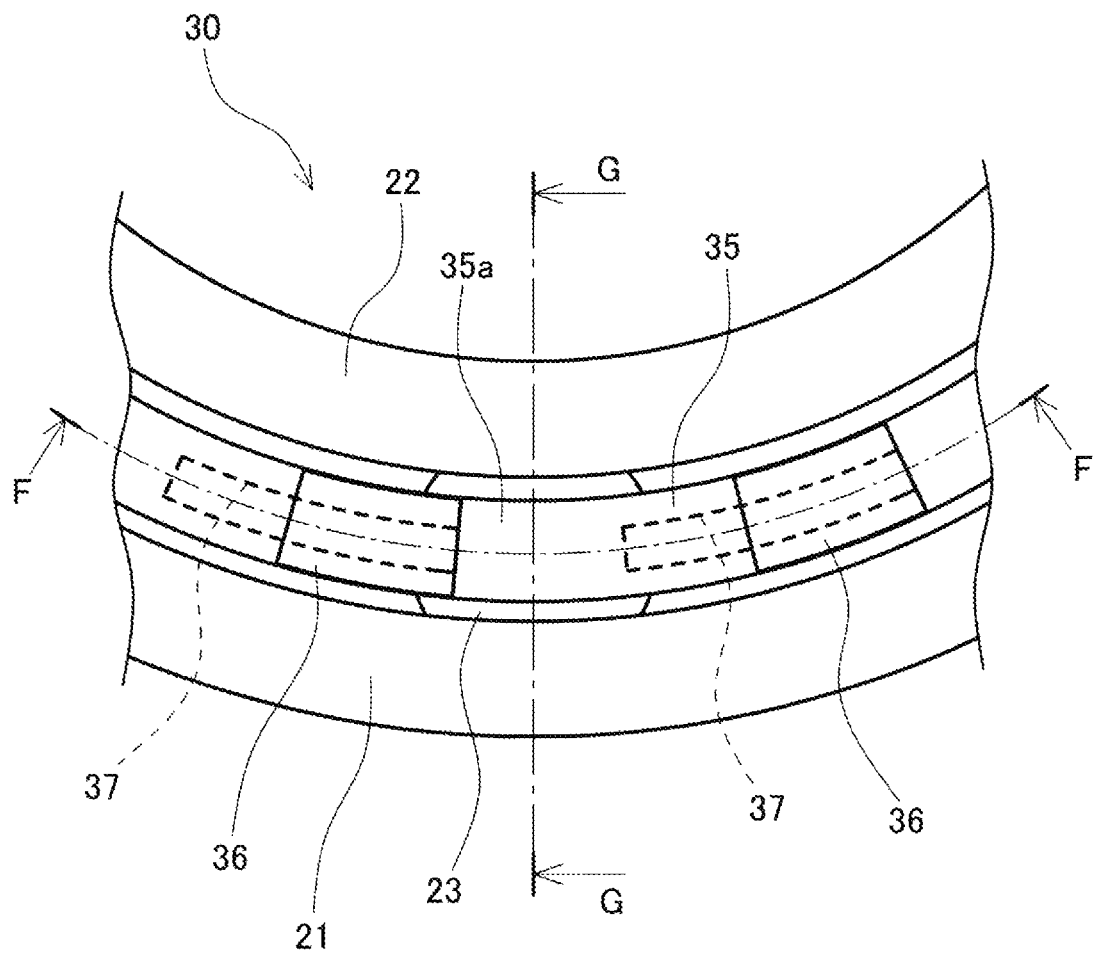
FIG. 4 is a diagram enlarging a part of a side surface of a ball bearing according to a second embodiment of the present disclosure.
Figure 5:
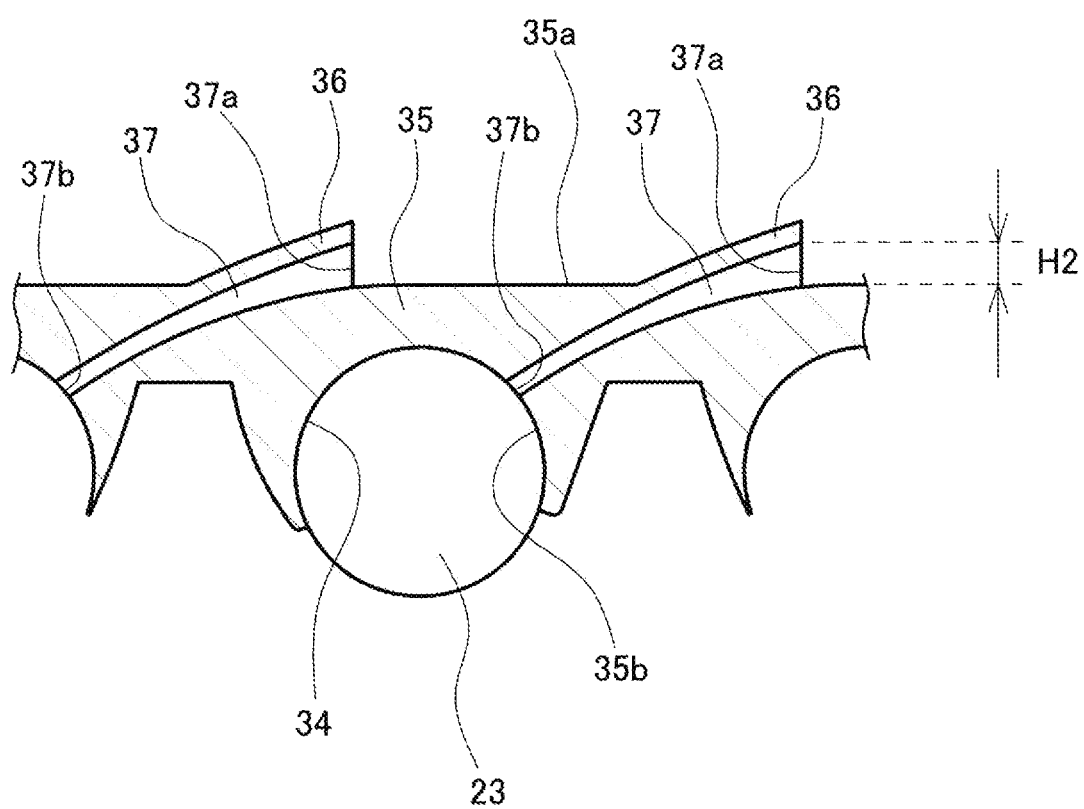
FIG. 5 is a diagram showing a cross section of a holder along a line F-F in FIG. 4.
Figure 6:
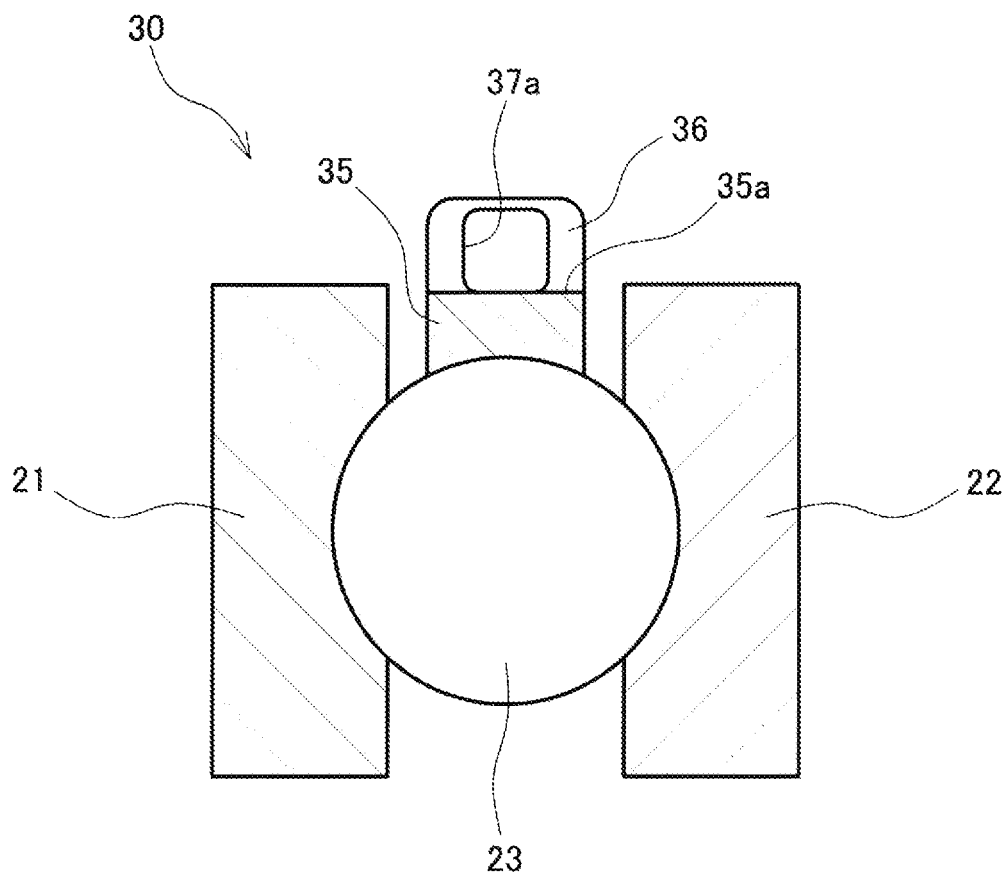
FIG. 6 is a cross sectional diagram along a line G-G in FIG. 4.
Figure 7:
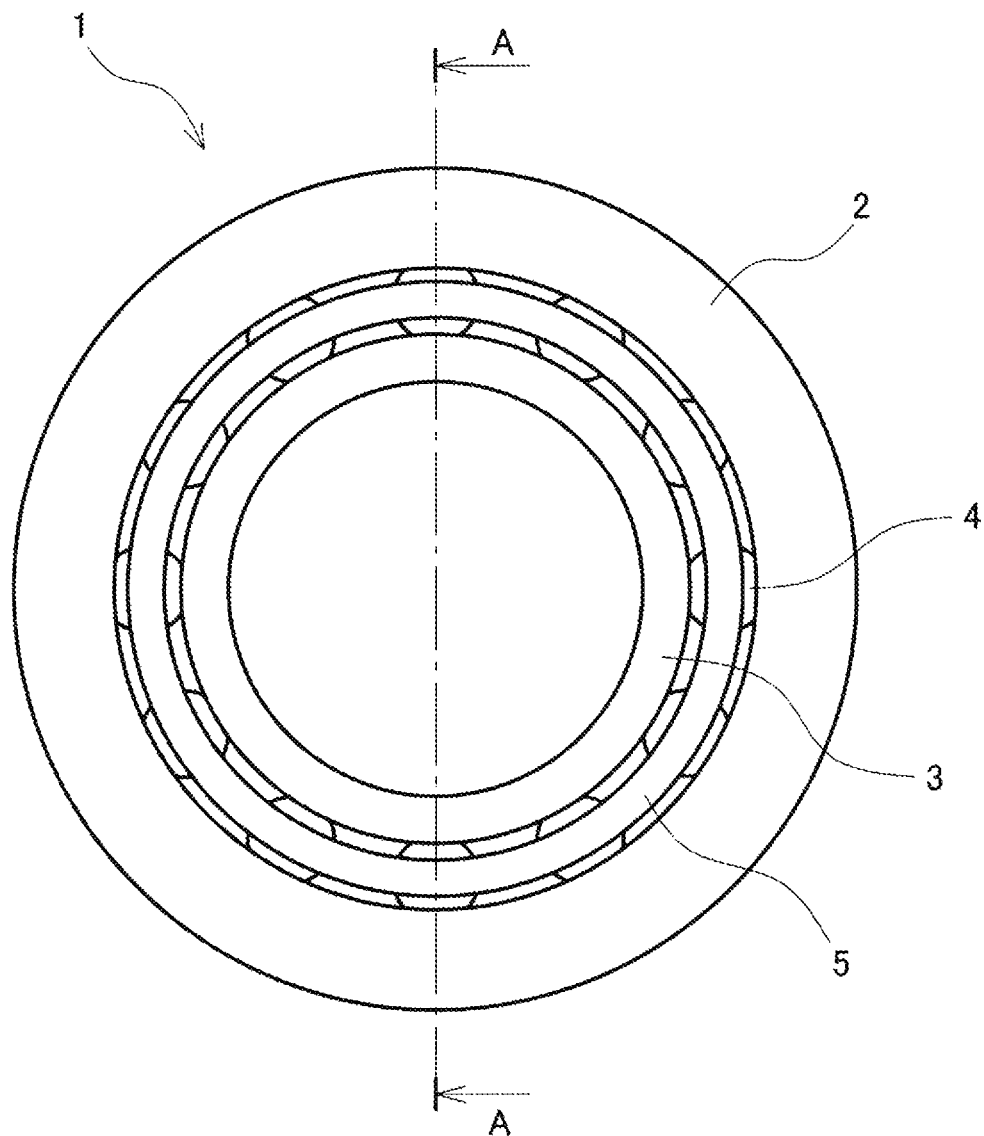
FIG. 7 is a side view of a ball bearing used for an evaluation test in which an inside lubrication state is observed.
Figure 8:
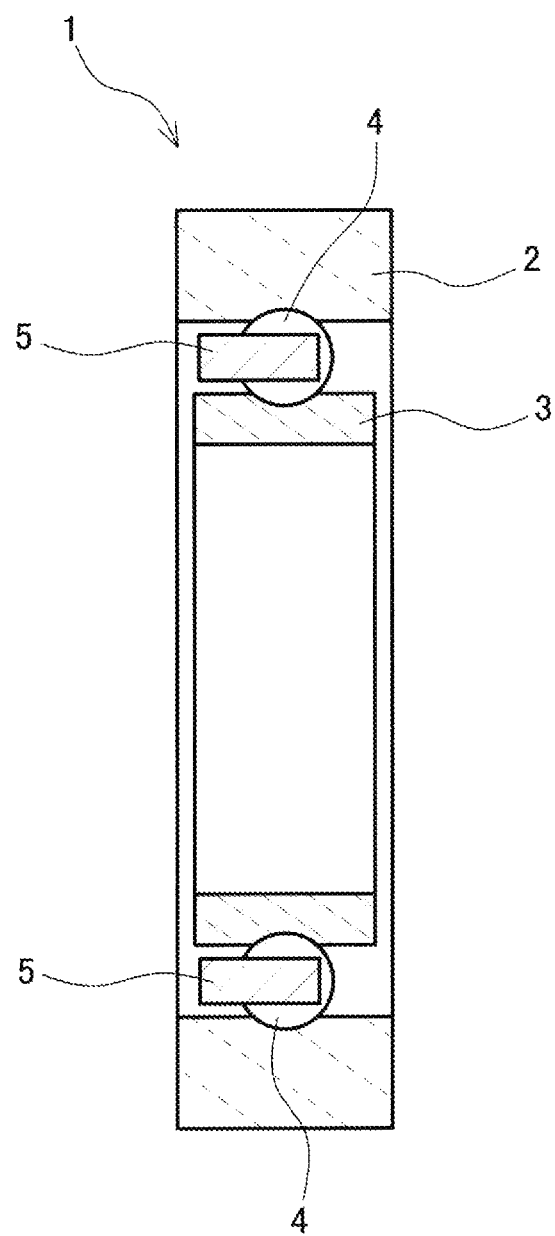
FIG. 8 is a cross sectional diagram along a line A-A in FIG. 7.
Figure 9:
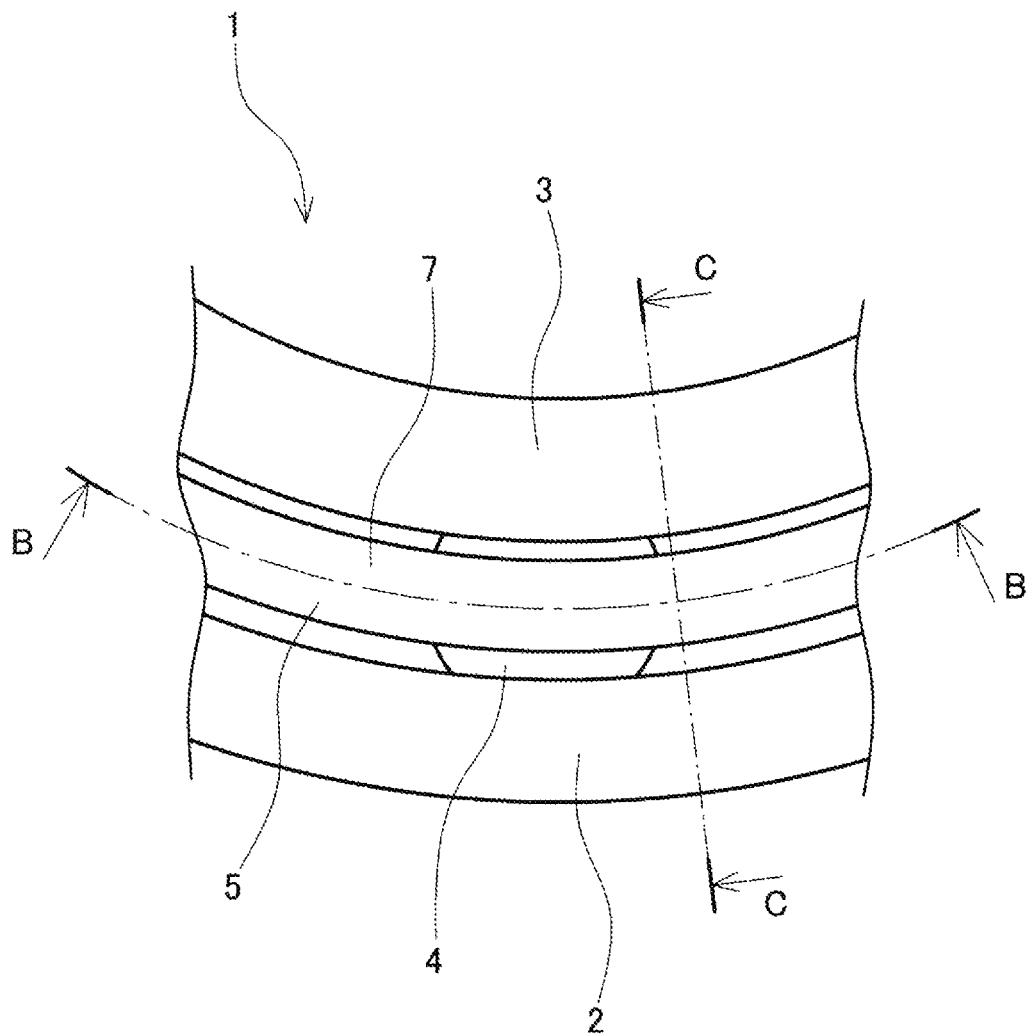
FIG. 9 is a diagram enlarging a part of a side surface of a ball bearing used for an evaluation test.
Figure 10:
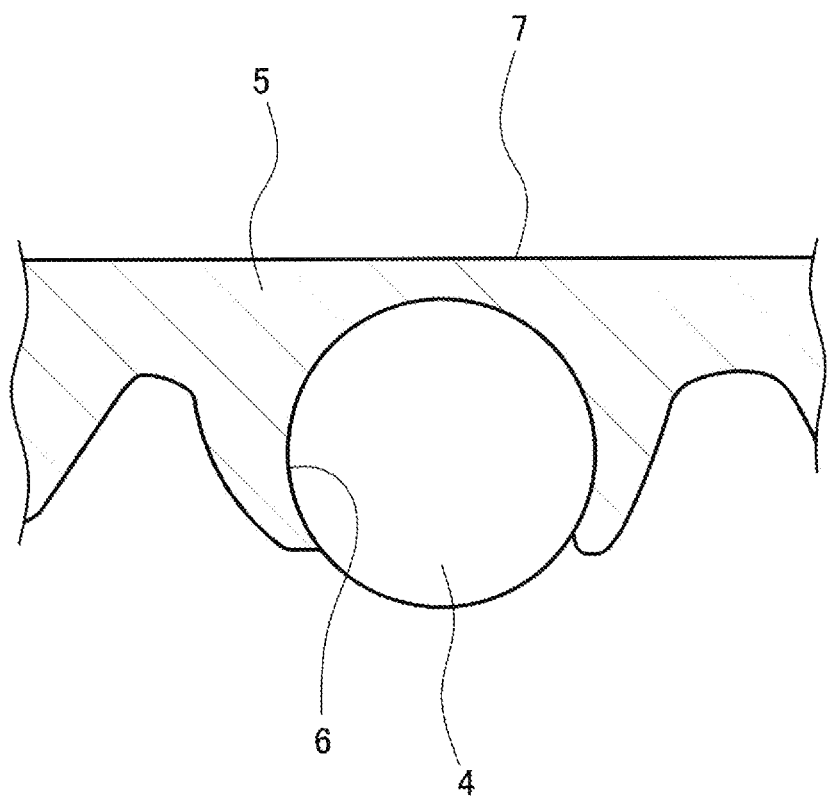
FIG. 10 is a diagram showing a cross section of a holder along a line B-B in FIG. 9.
Figure 11:
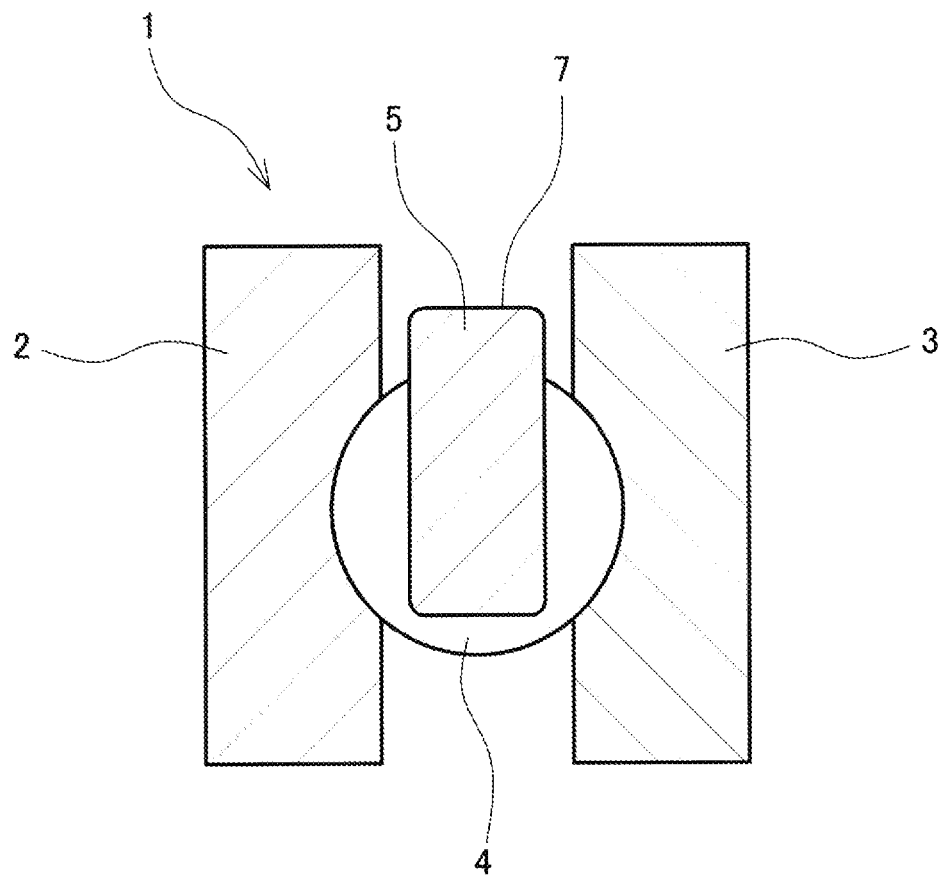
FIG. 11 is a cross sectional diagram along a line C-C in FIG. 9.
Figure 12:
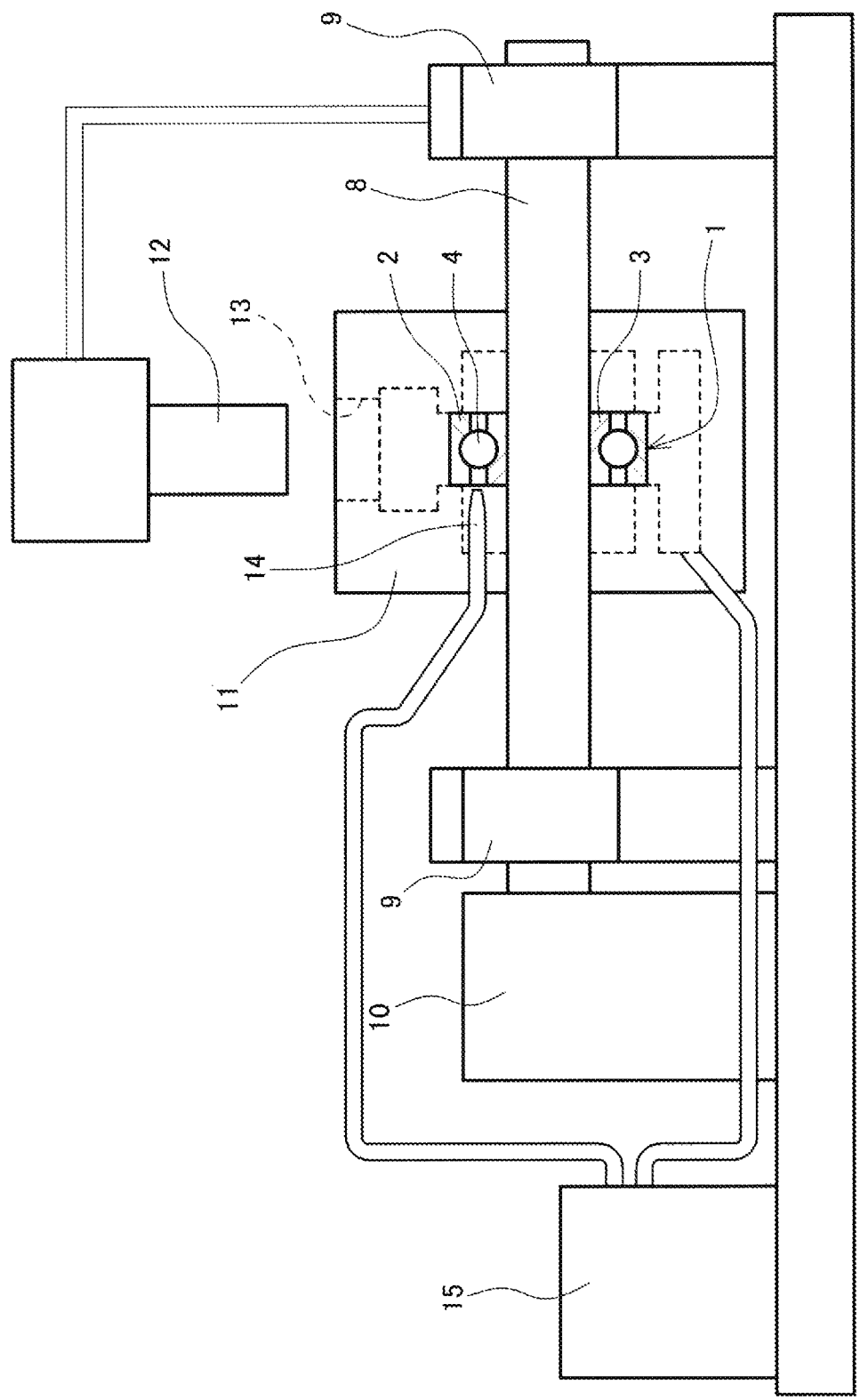
FIG. 12 is a diagram showing an overview of a testing apparatus used for an evaluation test in which an inside lubrication state of a ball bearing is observed.
Figure 13:
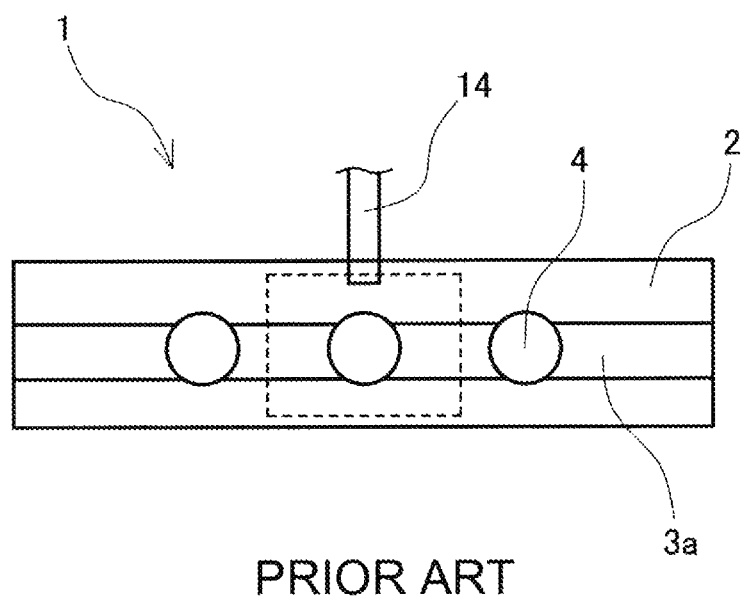
FIG. 13 is a diagram showing an observation region in an evaluation test in which an inside lubrication state of a ball bearing is observed.
Figure 14:
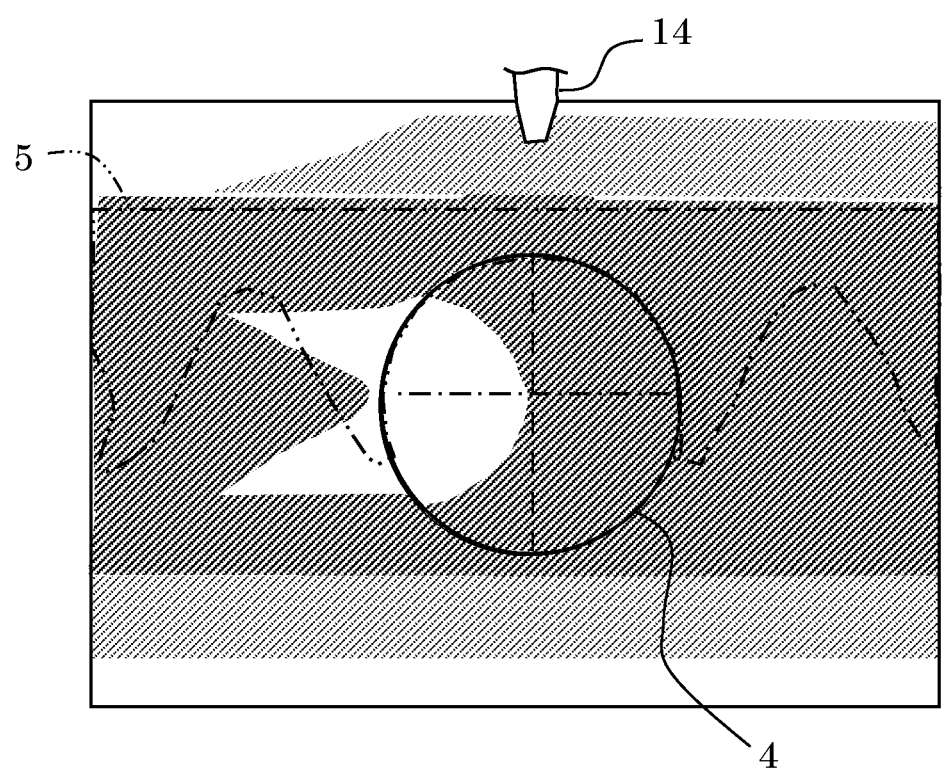
FIG. 14 is a diagram schematically showing an observation result of an oil distribution around a rolling surface when an axial rotation rate is set to about 2000 rpm.
Figure 15:
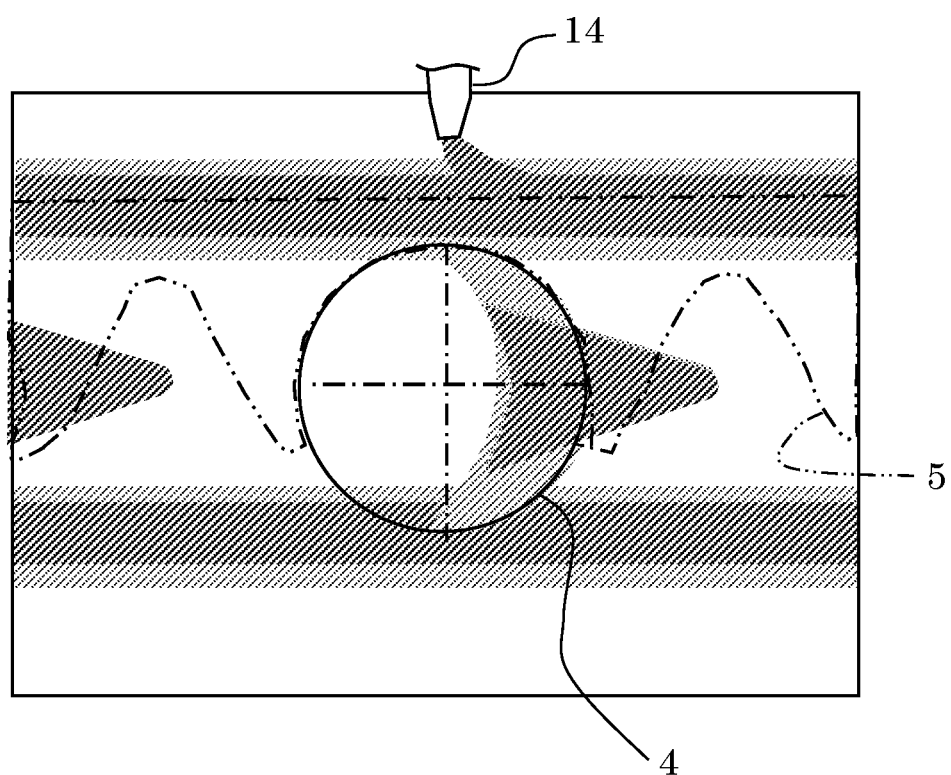
FIG. 15 is a diagram schematically showing an observation result of an oil distribution around a rolling surface when an axial rotation rate is set to about 20000 rpm.

Next, a ball bearing 30 according to a second embodiment of the present disclosure will be described with reference to FIGS. 4 to 6. FIG. 4 is a partial view of the ball bearing 30 having a circular ring shape. FIG. 5 is a cross-sectional diagram along a line F-F in FIG. 4, and shows a cross section of a holder 35 and a rolling element 23, for clearly showing a shape of the holder 35 provided in the ball bearing 30. FIG. 6 is a cross-sectional diagram along a line G-G in FIG. 4. With exception of the shape of the holder 35, the ball bearing 30 of the second embodiment has the same structure as that of the ball bearing 20 of the first embodiment. Elements identical to those of the ball bearing 20 of the first embodiment will be assigned the same reference numerals, and their description will not be repeated.

The ball bearing 30 is similarly employed for usages in which a single primary rotational direction is predetermined such as, for example, a driving unit for an automobile or a machine tool. When the inner ring 22 is rotated in the ball bearing 30 in the primary rotational direction of use, the rolling element 23 revolves toward the right side of FIG. 5. The direction to which the holder 35 rotates and advances with this rotation will be referred to as the front side in the circumferential direction (right side of FIG. 5), and the opposite direction will be referred to as the rear side in the circumferential direction (left side of FIG. 5).

As shown in FIGS. 4, 5, and 6, similar to the holder 25 of the ball bearing 20 of the first embodiment, in the holder 35 of the ball bearing 30, pockets 34 which hold the rolling elements 23 with a spacing in the circumferential direction and in a manner to allow rolling are formed toward an inner side in an axial direction. The holder 35 comprises a protrusion 36 which protrudes from a side surface 35a toward an axial direction along the circumferential direction. In addition, on the holder 35, an oil supply hole 37 which penetrates through the holder 35 from the side surface 35a to an inner surface of the pocket 35b from the front side in the circumferential direction toward the rear side in the circumferential direction is formed for each pocket 34. That is, an oil discharge outlet 37b is formed further toward the rear side in the circumferential direction than an oil introduction inlet 37a of the oil supply hole 37, and the oil supply hole 37 is formed to extend in an oblique direction with respect to the side surface 35a from the oil introduction inlet 37a toward the pocket inner surface 35b.

The oil introduction inlet 37a of the oil supply hole 37 is provided on a surface of the protrusion 36 at the front side in the circumferential direction so that the oil introduction inlet 37a is an opening facing the front side in the circumferential direction. In particular, the oil introduction inlet 37a may have an opening at a surface approximately perpendicular to the side surface 35a toward the front side in the circumferential direction. The oil discharge outlet 37b of the oil supply hole 37 is provided at a position for discharging the oil to a semispherical portion of the rolling element 23 at the front side in the circumferential direction. The height H2 of the oil introduction inlet 37a in the axial direction may be set to, for example, 2 mm to 5 mm.

In this manner, because the protrusion 36 is provided on the side surface 35a of the holder 35, and the oil introduction inlet 37a of the oil supply hole 37 is provided on the surface at the front side of the protrusion 36 so that the oil supply hole 37 is an opening facing the front side in the circumferential direction, as the holder 35 rotates, oil outside of the revolution region of the rolling element 23 is guided into the oil supply hole 37, and the oil can be introduced from the oil introduction inlet 37a to the oil discharge outlet 37b provided on the pocket inner surface 35b. As a consequence, the oil can be supplied to the front side in the circumferential direction of the rolling element 23. That is, in the ball bearing 30, oil can be effectively introduced from the side surface 35a to the front side in the circumferential direction of the rolling element 23 with the rotation of the holder 35. As a result, sufficiency of oil at the rolling surface under a high rotation condition can be ensured, and seizing and wear can be suppressed.

Further, the oil supply hole 37 may be configured such that a passageway narrows from the oil introduction inlet 37a toward the oil discharge outlet 37b. With the oil supply hole 37 having such a configuration, the flow rate of oil in the ball bearing 30 near the oil discharge outlet 37b can be increased, and spreading of the oil due to centrifugal force during high speed rotation can be reduced.

The invention claimed is:

1. A ball bearing comprising:
an outer ring on a surface at an inner side in a radial direction of which an outer raceway is formed;
an inner ring on a surface at an outer side in a radial direction of which an inner raceway is formed;
a plurality of rolling elements placed between the outer raceway and the inner raceway; and
a holder having a circular ring shape and on which a plurality of pockets which hold the rolling elements with a spacing in a circumferential direction and in a manner to allow rolling are formed, wherein
the holder comprises a protrusion which protrudes from a side surface at a side opposite in an axial direction with respect to the rolling element held in the pocket toward the side opposite in the axial direction, and
an oil supply hole which penetrates through the holder from the side surface to a surface at a side of the rolling element in the axial direction is formed in the holder, in such a manner that:
when the holder rotates, the protrusion guides oil into the oil supply hole, and the oil pours from the side surface to the surface.

2. The ball bearing according to claim 1, wherein
the oil supply hole is placed between the pockets which are adjacent to each other in the circumferential direction, and
with a direction of rotation and advancement of the holder being a front side in the circumferential direction and an opposite direction being a rear side in the circumferential direction,
the protrusion protrudes from an end at the rear side in the circumferential direction of an oil introduction inlet of the oil supply hole toward the front side in the circumferential direction, and
an oil guide surface which is inclined toward the front side in the circumferential direction as a distance from the side surface at the side opposite in the axial direction is increased is provided at the front side in the circumferential direction of the protrusion.

3. The ball bearing according to claim 2, wherein a height in the axial direction of the protrusion is greater than or equal to 1 mm and less than or equal to 10 mm, an angle between the side surface and the oil guide surface is greater than or equal to 10 degrees and less than or equal to 80 degrees, a width in the circumferential direction of the protrusion is greater than or equal to 1 mm, when a number of the rolling elements is n, a width angle in the circumferential direction of the protrusion is less than or equal to $2\pi/2n$, and a thickness in the radial direction of the protrusion is greater than or equal to 0.5 times and less than or equal to 1 times a maximum thickness in the radial direction of the holder.

4. The ball bearing according to claim 1, wherein with a direction of rotation and advancement of the holder being a front side in the circumferential direction and an opposite direction being a rear side in the circumferential direction, an oil introduction inlet of the oil supply hole is provided on a surface at the front side in the circumferential direction of the protrusion so that the oil introduction inlet is an opening facing the front side in the circumferential side, and an oil discharge outlet of the oil supply hole is provided at a position where the oil is discharged to a semispherical portion at the front side in the circumferential direction of the rolling element.

5. The ball bearing according to claim 4, wherein the oil supply hole is formed in such a manner that an area of a passageway is reduced from the oil introduction inlet toward the oil discharge outlet.

* * * * *